(No Model.)

C. F. HYDE.
FENCE WIRE WITH SPUR ATTACHMENT.

No. 277,288. Patented May 8, 1883.

WITNESSES:
Donn Twitchell.
C. Sedgwick

INVENTOR:
C. F. Hyde
BY Munn & Co
ATTORNEYS.

UNITED STATES PATENT OFFICE.

CHARLES F. HYDE, OF OTTAWA, KANSAS.

FENCE-WIRE WITH SPUR ATTACHMENT.

SPECIFICATION forming part of Letters Patent No. 277,288, dated May 8, 1883.

Application filed August 19, 1882. (No model.)

*To all whom it may concern:*

Be it known that I, CHARLES F. HYDE, of Ottawa, Franklin county, Kansas, have invented a new and useful Improvement in Fence-Wire with Spur Attachments, of which the following is a full, clear, and exact description.

The object of the invention is to improve the means for holding a spurred wheel between the two wires of a twisted wire-rail, as hereinafter described.

Reference is to be had to the accompanying drawings, forming part of this specification, in which similar letters of reference indicate corresponding parts in both the figures.

Figure 1:
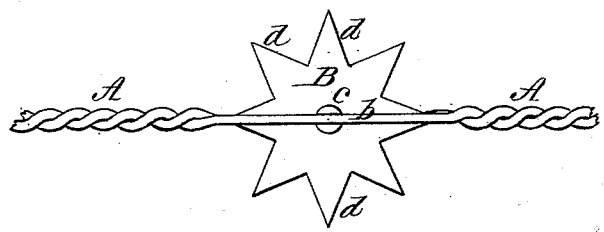
Figure 2:
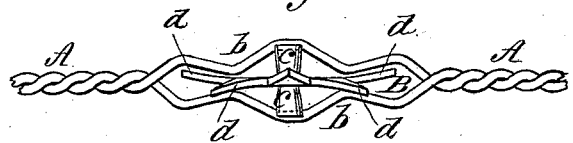

Figure 1 represents a plan of a piece of fence-wire with spur attached, and constructed to form a guard for carrying the spur within it. Fig. 2 is a side view of the same.

A indicates the fence-wire, which is formed of two strands twisted one upon the other and opened or separated at numerous points in their length to constitute continuous guards b, within each of which is arranged a freely-rotating metal spur, B, that turns upon a pivot, c. This pivot is of reversely conical shape or swelled toward each outer end to keep the spur in place and from binding. The teeth d of said spurs B have certain of them, preferably alternate ones, bent to project upward, while the intermediate ones turn downward at their points, as shown in Fig. 2. This reverse arrangement of the teeth gives a more effective action to the spurs as barbs for the fence.

A fence-wire thus provided with rotating spurs or barbs may be readily applied to different kinds of fences, and will most effectually serve to exclude animals from entering or stock within the fence from passing out or injuring it.

I am aware that it is not new to use a rotary spur-wheel on a staple and between two wires; but

What I claim as new is—

The pivot c, enlarging from the middle toward each end, in combination with the two twisted wires of a wire rail, whereby the pivot is held by the tension of the wires, so that a rotary spurred wheel may conveniently rotate therein, as described.

CHARLES F. HYDE.

Witnesses:
WM. V. ISHOM,
F. A. WILKINSON.